UNITED STATES PATENT OFFICE.

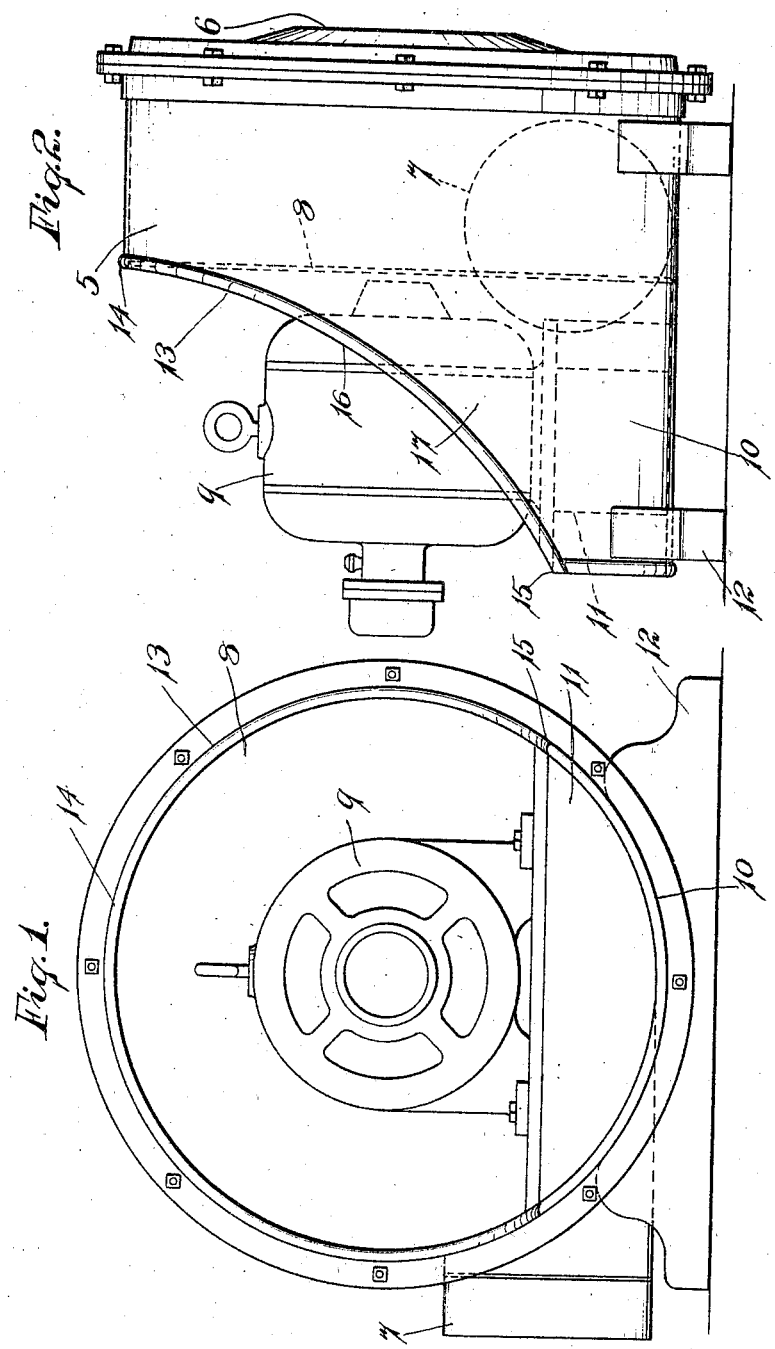

IRA H. SPENCER, OF HARTFORD, CONNECTICUT, ASSIGNOR TO THE ORGAN POWER COMPANY, OF HARTFORD, CONNECTICUT, A CORPORATION OF CONNECTICUT.

CASING FOR ORGAN-BLOWERS.

1,044,098.  Specification of Letters Patent.  Patented Nov. 12, 1912.

Application filed March 9, 1912. Serial No. 682,717.

*To all whom it may concern:*

Be it known that I, IRA H. SPENCER, a citizen of the United States, and a resident of Hartford, in the county of Hartford and State of Connecticut, have invented a new and Improved Casing for Organ-Blowers, of which the following is a specification.

My invention relates to the class of devices above named, and an object of the invention, among others, is to provide a casing of this character that shall be extremely strong and rigid while being of minimum weight.

One form of device embodying the invention, and in the construction and use of which the object above set out as well as others may be attained is illustrated in the accompanying drawings, in which—

Figure 1 is a view in front elevation of a casing embodying my invention with a motor located therein. Fig. 2 is a view in side elevation of my improved motor casing.

The casing herein illustrated and described incloses mechanism operated by a motor located in one end of the casing and separated from that part in which the mechanism is contained, and said casing also embodies means whereby the motor is readily accessible, the numeral 5 denoting the body of the casing, in the present instance a fan casing, having an inlet 6 and an outlet or exhaust 7, the chamber in the body being inclosed at the end opposite the inlet by a wall 8. A motor 9 is located in a projecting part 10 from the body, being supported upon a motor base 11, and the case as a whole being supported upon standards 12. The shaft of the motor is connected with the fan shaft within the casing, the motor serving for driving said fan.

It is essential that the motor shall be readily accessible, but being extremely heavy, as is usual in devices of this class, in providing means for gaining access to the motor its rigid support must be carefully borne in mind, as it is of the utmost importance that the part sustaining the motor shall be rigid and immovable with respect to the part sustaining the fan shaft to which the motor is secured. In attaining this end I cut away the upper portion of the casing as at 13, cutting away the extreme upper part 14 entirely as well as the extreme lower part 15 at the upper surface of the motor base. In so cutting away the casing to gain access to the motor I remove the metal of the cylindrical casing on a curved line 16 which forms a brace 17 between the projecting part or support 10 for the motor and the upper portion of the body part 5, this brace by this formation being integral with the body and motor support and producing a very rigid structure.

I claim—

1. A casing including a cylindrical body-part the lower portion of which is extended to constitute a motor support formed on an arc of a circle equal to that of the body part, and an integral bracing wall extending between said motor supporting part and body.

2. A case including a body portion of cylindrical form and an extension on the lower part forming a motor support, the tension being formed on the same arc as that of the body part, and integral bracing walls the edges of which are formed on arcs of circles extending from the upper portion of the body part to the upper part of said support, and a motor located on a base within said motor support.

IRA H. SPENCER.

Witnesses:
ARTHUR B. JENKINS,
EVA L. STOUGHTON.